United States Patent
Hwang et al.

(10) Patent No.: US 9,444,922 B2
(45) Date of Patent: Sep. 13, 2016

(54) INFORMATION PROVISION METHOD AND APPARATUS OF MOBILE TERMINAL

(75) Inventors: Jae Joon Hwang, Seoul (KR); Hyo Young Kim, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 1056 days.

(21) Appl. No.: 13/114,136

(22) Filed: May 24, 2011

(65) Prior Publication Data
US 2011/0289438 A1 Nov. 24, 2011

(30) Foreign Application Priority Data
May 24, 2010 (KR) ........................ 10-2010-0047960

(51) Int. Cl.
| | | |
|---|---|---|
| G06F 3/048 | (2013.01) | |
| H04M 1/2745 | (2006.01) | |
| G06F 3/0482 | (2013.01) | |
| H04N 21/4788 | (2011.01) | |
| H04N 7/14 | (2006.01) | |
| H04N 7/15 | (2006.01) | |

(52) U.S. Cl.
CPC ........ *H04M 1/27455* (2013.01); *G06F 3/0482* (2013.01); *H04N 7/147* (2013.01); *H04N 7/15* (2013.01); *H04N 21/4788* (2013.01)

(58) Field of Classification Search
USPC ..................................................... 348/14.07
See application file for complete search history.

(56) References Cited

U.S. PATENT DOCUMENTS

| | | | |
|---|---|---|---|
| 7,375,730 B2 * | 5/2008 | Tagliabue et al. ............ 345/581 |
| 2007/0035513 A1 * | 2/2007 | Sherrard et al. .............. 345/157 |
| 2007/0135109 A1 * | 6/2007 | Walter .................. H04M 15/00 455/415 |
| 2009/0033737 A1 * | 2/2009 | Goose .................. G06F 3/0481 348/14.07 |
| 2010/0062753 A1 * | 3/2010 | Wen .................. H04M 1/27455 455/418 |
| 2010/0159909 A1 * | 6/2010 | Stifelman ......... H04M 1/27455 455/418 |
| 2010/0245262 A1 * | 9/2010 | Vance et al. .................. 345/173 |
| 2010/0262928 A1 * | 10/2010 | Abbott .......................... 715/769 |
| 2011/0171934 A1 * | 7/2011 | Lim et al. .................. 455/412.1 |
| 2012/0317515 A1 * | 12/2012 | Wang et al. .................. 715/841 |

FOREIGN PATENT DOCUMENTS

KR 10-2009-0124087 A 12/2009

OTHER PUBLICATIONS

Strietelmeier, Julie, A Week With The Palm Pre Smartphone, the gadgeteer, pp. 1-46.*
Chartier, David, Review: Skype finally does VoIP right on the iPhone, arstechnica, pp. 1-5.*
Sherrard, Andrew, et al.; Patent Application Publication No. US 2007 / 0035513 A1; Publication Date:Feb. 15, 2007; "Preferred Contact Group Centric Interface;".
Korean Intellectual Property Office Notification of Preliminary Rejection dated Mar. 24, 2016.

* cited by examiner

Primary Examiner — Jeffrey A Gaffin
Assistant Examiner — Justin Lee
(74) Attorney, Agent, or Firm — Cha & Reiter, LLC.

(57) ABSTRACT

An event-triggered contact information provision apparatus and method of a mobile terminal is provided for presenting contact information of a person, who has triggered an event, around the contact object representing the person on a specific screen. An information provision method of a mobile terminal preferably includes detecting an event; tracing a contact object associated with triggering the event; and presenting contact information of a person triggering the event around at least a portion of the contact object on a display of the mobile terminal.

20 Claims, 8 Drawing Sheets

INFORMATION PROVISION METHOD AND APPARATUS OF MOBILE TERMINAL

CLAIM OF PRIORITY

This application claims priority under 35 U.S.C. §119 from Korean Patent Application No. 10-2010-0047960, filed in the Korean Intellectual Property Office on May 24, 2010, the entire contents of which are incorporated herein in its entirety.

BACKGROUND OF THE INVENTION

1. Field of the Invention

The present invention relates to a mobile terminal and, in particular, to an event-triggered contact information provision apparatus and method of a mobile terminal for providing contact information.

2. Description of the Related Art

With the advance of data communication and semiconductor technologies, the use of mobile terminals has become widespread and the number of users continues increasing rapidly. Recently, mobile terminals are evolving into multifunctional devices integrating various functions in line with convergence of a number of electronic devices. For example, more recent mobile communication terminals integrate various multimedia functions including TV (Television) function such as DMB (Digital Multimedia Broadcasting) and DVB (Digital Video Broadcasting), music player function (e.g., MP3 (MPEG Audio Layer-3)), camera function, Internet function, and electronic dictionary function, as well as the conventional communication function such as voice and message communication.

In order to implement such multiple functionality in a mobile terminal, various tentative attempts are being adopted in view of hardware and software. For example, a User Interface (UI) is one of the most important parts influencing the user's convenience and, as a consequence, such technical attempts are most frequently made to the UI to meet the requirements of new supplementary functions and improvement of user's convenience.

SUMMARY OF THE INVENTION

The present invention provides a mobile terminal with new supplementary functions.

Also, the present invention includes a user interface that provides, when an event occurs on the screen having contact objects representing persons, contact information of the person triggered the event around the contact object representing the counterpart.

In addition, the present invention provides a mobile terminal and a method for controlling the mobile terminal that changes configuration of a specific screen having contact objects according to the usage frequencies of the contact objects, presenting, when an event occurs, contact information of the person triggered the event around the contact object representing the person without switching screen, and executing a function in response a user interaction to the event.

Furthermore, the present invention provides an information provision method and apparatus of a mobile terminal that provides, when an event occurs, contact information of a person triggered the event around a contact object representing the person without screen switching, resulting in improvement of usability and usage convenience and familiarity.

In accordance with an exemplary aspect of the present invention, an information provision method of a mobile terminal includes detecting an event; tracing a contact object associated with the event; and presenting contact information of a person triggered the event around the contact object.

Preferably, the contact information is presented around the contact object in the form of one of a text balloon type popup and an overlay type enlargement without screen switching.

Preferably, the information provision method can be stored in a computer-readable storage medium includes programs in the form of programs executable by a processor, or microprocessor (i.e. controller).

In accordance with another exemplary aspect of the present invention, an information provision apparatus of a mobile terminal includes a display unit which displays a screen having at least one contact object representing a contact who can trigger an event along with contact information; and a control unit which updates configuration of the specific screen according to usage frequency of at least one contact object and controls, when an event occurs, the display unit to present the contact information of the contact who triggered the event around the contact object.

BRIEF DESCRIPTION OF THE DRAWINGS

The above and other exemplary objects, features and advantages of the present invention will become more apparent from the following detailed description in conjunction with the accompanying drawings, in which.

DETAILED DESCRIPTION

Exemplary embodiments of the present invention are described herein with reference to the accompanying drawings in detail. The same reference numbers are used throughout the drawings to refer to the same or like parts. Detailed descriptions of well-known functions and structures incorporated herein may be omitted to avoid obscuring appreciation of the subject matter of the present invention by a person of ordinary skill in the art.

An exemplary aspect of the present invention proposes an apparatus and a method for controlling an electronic device that updates configuration of a specific screen (e.g., Home screen) automatically in accordance with usage frequency of contact objects. The present invention also notifies, when an event occurs, of the event or executes interaction related to the event with the corresponding contact object. According to an exemplary embodiment of the present invention, when an event occurs in a specific screen (e.g., standby screen) presenting contact objects, the contact information of the counterpart triggered the event is fed back along with the contact object representing the counterpart.

In the following description, the contact information can be presented in many different forms, one possible example of which is the form of a text balloon type popup or an overlay type enlargement of the contact object according to the event type (e.g., incoming call or incoming message) in a predetermined manner. The contact information includes the information of the contact, for example, a person who triggered the event such as incoming call receipt and incoming message receipt. The event information can include type information indicating the type of the event (e.g., incoming call or message) and the information on the counterpart who has triggered the event (e.g., name and/or phone number of the counterpart). The contact information can include the options for making interactions available in response to the event as well as the event information.

In the following description, a contact object refers to a counterpart-specific item representing a contact (which may be a person or an entity) which is provided in a specific screen and can be mapped to counterpart information based on a phonebook. The contact object can be registered or deregistered with a specific screen according to a predefined configuration condition. The contact object can be provided in the form of an icon of still or motion image or a text.

A description is made of the configuration of the mobile terminal and the method for controlling operations of the mobile terminal according to the exemplary embodiments of the present invention are described with reference to FIGS. 1 to 8. It should be noted that the configuration of the mobile terminal and the method for controlling operations of the mobile terminal according to the embodiments of the present invention are not limited to the description made herein but can be applied to various other embodiment.

Figure 1:
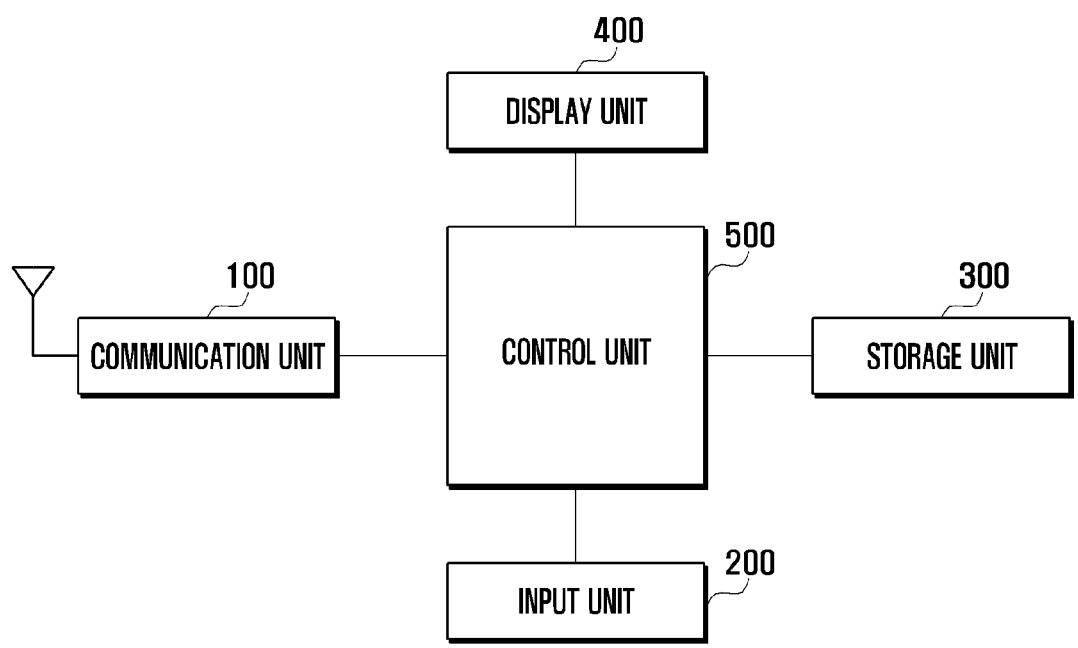
FIG. 1 is a schematic block diagram illustrating a configuration of a mobile terminal according to an exemplary embodiment of the present invention.

FIG. 1 is a schematic block diagram illustrating a configuration of a mobile terminal according to an exemplary embodiment of the present invention.

As shown in FIG. 1, the mobile terminal includes a communication unit 100, an input unit 200, a storage unit 300, a display unit 400, and a control unit 500. The mobile terminal may further include general function blocks such as an audio processing unit having a microphone (MIC) and a speaker (SPK), a digital broadcast unit for receipt and playback of digital broadcast (e.g., DMB (Digital Multimedia Broadcasting (DMB) and DVB (Digital Video Broadcasting)), a camera unit for capturing still/motion picture, a Bluetooth communication unit for Bluetooth communication, and touchpad for receiving touch-based input, of which descriptions and depictions are omitted herein.

The communication unit 100 preferably includes at least one of Radio Frequency (RF) module for processing radio signal carrying audio/video call and message data and Internet access module for supporting access to Internet. Particularly in an exemplary embodiment of the present invention, the communication unit 100 sends the data carried by the received radio signal to the control unit 500. Here, the data can be the incoming call or message data.

The input unit 200 detects an input event made by the user and sends a corresponding input signal to the control unit 500. The input unit 200 can be provided with a plurality of buttons, and it is within the spirit and scope of the claimed invention that the input unit and display unit may comprise a single module. The input unit 200 may also be provided with one or more actuators, such as buttons, for generating input signals for executing interaction related to the event based on the contact information described later. The input unit 200 also can include at least one button for generating an input signal for settings related to the contact information output for the event.

The storage unit 300 stores various programs and data executed and processed in the mobile terminal and includes at least one of volatile and nonvolatile memory devices. For example, the storage unit 300 stores the Operating System (OS) of the mobile terminal, the program and data related to the control of the display unit 400, the program and data related to the control of the input made on the display unit 400, the program and data related to the control of tracing the contact object and displaying contact information of the person triggered the event around the contact object representing the counterpart, and the program and data related to the control of switching configurations of a specific screen (e.g., standby screen) in consideration of usage frequency of counterpart-specific contact object, semi-persistently or temporarily. The storage unit 300 can include a storage region for storing the counterpart-specific contact objects constituting a specific screen (e.g., standby screen), a storage unit for storing the mappings of the count values of the contact objects' usage frequencies and the counterpart information, and a storage region for storing various settings related to the output of contact information. The storage unit may comprise primary and second storage, as well as different types of storage, RAM, ROM, such as cache, etc.

The display unit 400 is responsible for displaying execution screens of applications running in the mobile terminal. For example, the display unit 400 displays the execution screens of the message function, email function, Internet function, multimedia function, search function, communication function, electronic book (e-book) function, motion picture playback function, still/motion picture capturing function, still/motion picture playback function, TV playback function (e.g., mobile broadcast such as DMB and DVB), music playback function (e.g., MP3), widget function, memo function, etc. The display unit 400 is preferably implemented with a Liquid Crystal Display (LCD) in general, however also can be implemented with an Organic Light Emitting Diode (OLED) or Active Matrix OLED (AMOLED).

The display unit 400 is preferably configured to support display of video data in both the landscape and portrait modes. The display unit 400 can be provided with a touch input module (not shown). That is, the display unit 400 can be equipped with touchscreen technology. The display unit 400 supports touch-based input as described herein and transfers the input signal (touch signal) to the control unit 500.

The display unit 400 is preferably adapted to display the contact object to which an event is made in a specific screen along with contact information. The display unit 400 provides the screen having the counterpart-specific contact object according to a preset configuration. The display unit 400 also preferably displays the screen in which the contact object appears or disappears according to the usage frequency of the counterpart-specific contact object. The control unit 400 can control such that, when an event occurs, the contact information of the person who triggered the event is presented around the contact object with switching screens. The description is made of the screens displayed in accordance with the operations related to contact object and contact information. In the following description, the terms 'specific screen,' 'event,' contact object,' and 'contact information' are used for the sake of convenience of explanation.

The control unit 500 preferably controls general operations of the mobile terminal. The control unit 500 is able to control the change of the configuration of the specific screen in accordance with the usage frequency of the counterpart-specific contact object. When an event is detected, the control unit 500 checks the usage frequency based on the counterpart information corresponding to the event.

The control unit 500 traces the contact object in response to the event occurred. For example, when an event occurs, the control unit 500 extracts the event information (e.g., caller information) and searches the phonebook for the contact information (e.g., phone number) corresponding to the event information. The control unit 500 also can trace the contact object based on the counterpart information.

The control unit 500 can control such that the contact information corresponding to the event is presented around the traced contact object. For example, if an event (e.g., receipt of voice call or message) occurs, the control unit 500 traces the contact object corresponding to the event. The control unit 500 can control such that the contact information of the person who triggered the event is presented in the current screen having at least one counterpart-specific contact object without screen change. In other words, the control unit 500 can control such that the contact information determined according to the type of the event is presented around the traced contact object while maintaining the current screen having the contact object. For example, when a message is received from a person A, the control unit 500 traces the contact object based on the counterpart information of the person A and presents the contact information as the indication of the receipt of the message from the person A in the form of, for example, a text balloon type popup or a overlay type enlargement.

The control unit 500 controls such that the event is handled with the interaction according to the signal input based on the presented contact information. For example, the control unit 500 can cause interaction related to the event in response to the signal input by means of the options such as menus item provided in association with the contact information. Referring now to the aforementioned example, as the menu item (e.g., "Call" item or "Message" item) related to the contact information presented in response to the event of the message receipt from the person A is selected, the control unit 500 place a call or check the incoming message according to the selected menu item.

A description will now be made of the operations of mobile terminal and the method for controlling the operations according to the present invention in detail hereinafter.

Also, the control unit 500 can also preferably perform the control operations related to the general functions of the mobile terminal. For example, the control unit 500 can control such that, when an application is executed, the data related to the executed application are managed to be effectively displayed. The control unit 500 can control the contact information-based function (e.g., incoming message check and call placement) after the feedback of the contact information in response to the event.

The structural configuration depicted in FIG. 1 can be applied to any of bar type, folder type, slide type, swing type, and flip type mobile terminals, as well as tablets and other types of portable communication devices. The mobile terminal according to an exemplary embodiment of the present invention may comprise any of all the types of information communication devices and multimedia devices and their equivalents. For example, the mobile terminal may comprise any of various portable devices including a mobile communication terminal operating in accordance with specific communication protocols supported by the corresponding communication system, a Portable Multimedia Player (PMP), a digital broadcast player, a Personal Digital Assistant (PDA), a music player (e.g., MP3 player), a game console, and a Smartphone, just to name a few non-limiting possibilities.

The method for providing the contact information around the contact object in response to the event according to an exemplary embodiment of the present invention can also be applied to the relatively large devices such as a Television (TV), a Large Format Display (LFD), a Digital Signage (DS) a media pole, a Personal Computer (PC), and a laptop computer.

Figure 2:
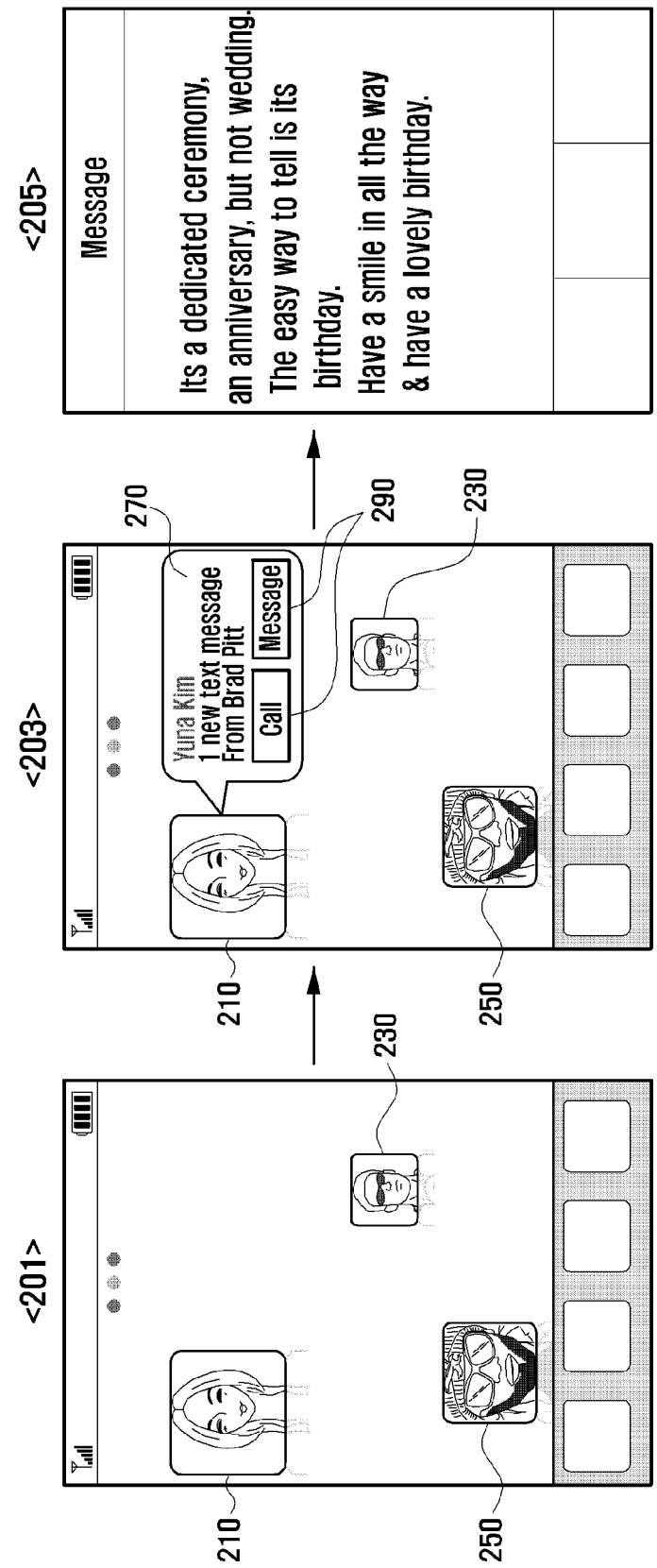
FIG. 2 is a diagram illustrating exemplary screens providing information in the event-triggered information provision method of a mobile terminal according to an exemplary embodiment of the present invention.

FIG. 2 is a diagram illustrating exemplary screens providing information in the event-triggered information provision method for a mobile terminal according to an exemplary embodiment of the present invention. An artisan understands and appreciates that although the screens are shown in a "portrait" format, it is within the spirit and scope of the claimed invention that a "landscape" format may also be used. Particularly, FIG. 2 shows an exemplary case where the contact information is fed back in response to an incoming message receipt event.

As shown in part 201 of FIG. 2, a specific screen (e.g., standby screen) having contact objects 210, 230, and 250 representing three individual persons is displayed. If an event such as an incoming message or call receipt occurs in the state of screen as depicted in part 201 of FIG. 2, the contact information of the person triggered the event is presented around the corresponding counterpart's contact object on the current screen without screen switching.

For example, a message can be received by the communication unit 100, i.e., the message receipt event can occur, in the state where the screen 201 is displayed. In the exemplary case of FIG. 2, it is assumed that the message is received from the counterpart represented by the contact object 210. If the message receipt event occurs, the control unit 500 controls such that the contact information 270 of the corresponding counterpart is presented around the counterpart's contact object 210 as shown in part 203 of FIG. 2. In detail, when the message receipt event is detected, the control unit 500 performs parsing on the event information to extract the counterpart information (e.g. phone number). The event information can include event type information and caller information (e.g. phone number).

Once the counterpart information is acquired, the control unit 500 can trace the contact object having the counterpart information from among the contact objects 210, 230, and 250. In an exemplary embodiment of the present invention, the contact object is preferably mapped to the counterpart information including the image, name, and phone number registered with the phonebook. The control unit 500 preferably controls such that the contact information 270 alarming the receipt of the message is presented around the contact object representing the counterpart 210 while maintaining the current screen. Accordingly, the user can recognize which event is triggered by which counterpart intuitively. At this time, the contact information 270 can be presented in the form of, for example, a text balloon type popup as shown in part 203 of FIG. 2. Such a text balloon type popup can be presented when the event relates to the receipt of a message. However, the contact information is not limited to being presented in the form of text balloon type popup but can be provided in the form of overlay type enlargement or other formats according to the user's setting. In addition, for privacy reasons, it is possible that messages from certain senders are not merely displayed on the screen but require a touch or other type of manipulation to view so that if one, for example, walks away from one's desk leaving the device thereon, message do not just display on the screen for anyone to view.

As shown in part 203 of FIG. 2, the contact information 270 can include counterpart information (e.g., name and/or phone number), event type information notifying of the incoming message, and menu items 290 (executable options) for determining the interaction to be taken by the user. The user can select one of the menu items for the next action. For example, the user can select the "Call" menu item to place a call to the corresponding counterpart or the "Message" menu item to check the new incoming message. Assuming that the "Message" menu item is selected by the user in the popup window, the messaging application is executed to display the content of the message received from the corresponding counterpart as shown in part 205 of FIG. 2. Part 205 of FIG. 2 shows the incoming message presentation screen which can be provided in various formats according to the configuration of the user interface.

Figure 3:
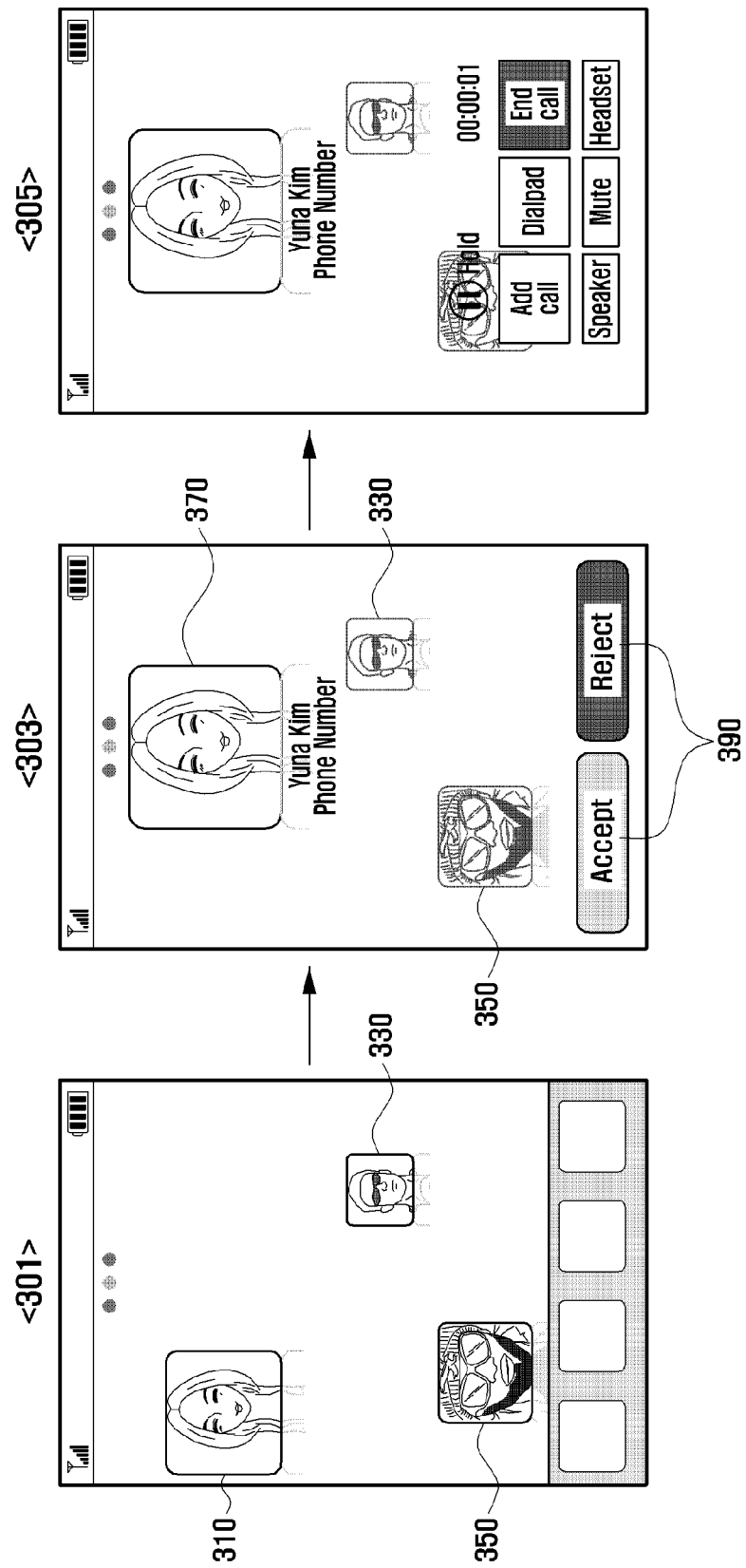
FIG. 3 is a diagram illustrating exemplary screens providing information in the event-triggered information provision method of a mobile terminal according to another exemplary embodiment of the present invention.

FIG. 3 is a diagram illustrating exemplary screens providing information in the event-triggered information provision method of a mobile terminal according to another exemplary embodiment of the present invention. More particularly, FIG. 3 shows an exemplary case where the contact information is fed back in response to an incoming call receipt event.

As shown in part 301 of FIG. 3, a specific screen (e.g., standby screen) having counterpart-specific contact objects 310, 330, and 350 representing three persons is displayed. If an event such as an incoming message or call receipt occurs in the state as depicted in part 301 of FIG. 3, the contact information of the person who triggered the event is presented around the corresponding counterpart's contact object on the current screen without screen switching.

For example, a call can be received by means of the communication unit 100, i.e., the call receipt event can occur, in the state where the screen 301 is displayed. In the exemplary case of FIG. 3, it is assumed that the event is triggered by the counterpart corresponding to the counterpart information of the contact object 310. When the incoming call receipt event occurs, the contact information 370 is presented by being displayed around the contact object 310 corresponding to the event as depicted in part 301 of FIG. 3. In more detail, when the incoming call receipt event is detected, the control unit performs parsing on the event information of the event to extract the information (e.g., phone number) on the counterpart triggered the event. The event information can include the type of the event and caller information (e.g., phone number).

The control unit 500 can trace the contact object having the counterpart information identical with the caller information from among the contact objects 310, 330, and 350. In an exemplary embodiment of the present invention, the contact object can be mapped to the counterpart information such as image, name, and phone number of the counterpart registered with the phonebook as aforementioned. The control unit 500 also can feed back by presenting the contact information 370 notifying the user of the call receipt event displayed around the contact object representing the counterpart 310. Accordingly, the user can recognize which event has occurred by which counterpart. At this time, the contact information 370 can be presented along with the corresponding contact object 310 which moves to the center of the screen and enlarged in size at a predetermined rate. This contact information presentation option is called overlay type enlargement. Although it is presented in form of the overlay type enlargement in this exemplary embodiment, the contact information 370 can be presented in the form of text balloon popup as described above or other types of display formats according to the user's configuration.

As shown in the screen image of part 303 of FIG. 3, the control information 370 can include the counterpart information on the person represented by the contact object 310 (e.g., name and phone number), type of the event, and menu items 390 executing optional functions available in association with the event. The user can execute one of the functions associated with the event by selecting one of the menu items. For example, the user can select "Accept" menu item to start communication with the counterpart or "Reject" menu item to reject the incoming call. In case that the user select "Accept" item in the state where the contact information 370 is presented in response to the event as shown in the screen image of part 303 of FIG. 3, the control unit 500 accepts the incoming call such that the user can communicate with the counterpart as shown in the screen image of part 305 of FIG. 3. Part 305 of FIG. 3 shows the voice communication execution screen which can be displayed in various formats according to the user interface supported by the mobile terminal.

Figure 4:
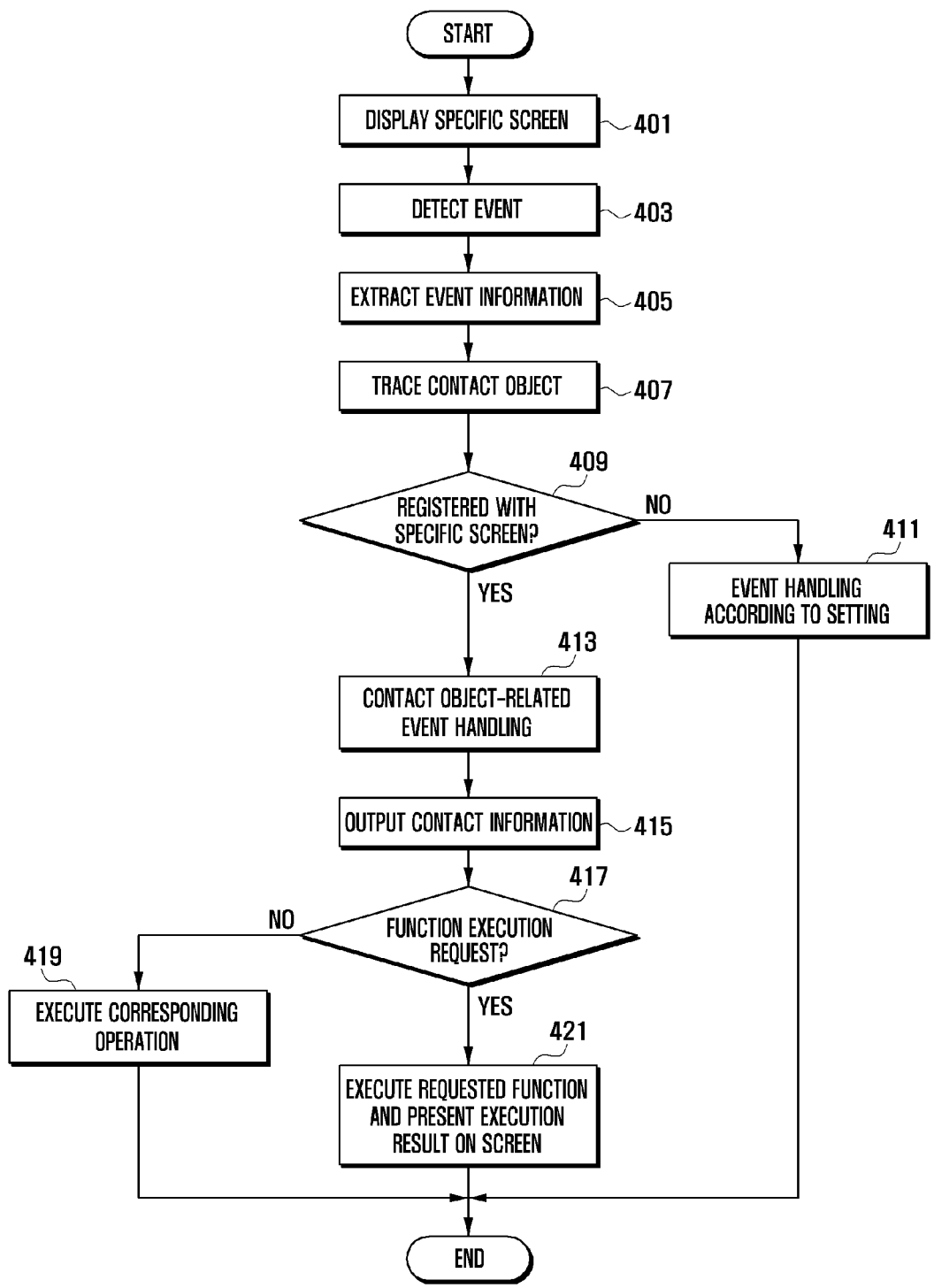
FIG. 4 is a flowchart illustrating an event-triggered information provision method of a mobile terminal according to an exemplary embodiment of the present invention.

FIG. 4 is a flowchart illustrating an event-triggered information provision method of a mobile terminal according to an exemplary embodiment of the present invention.

Referring now to FIG. 4, the control unit 500 (shown in FIG. 1) controls such that a specific screen having one or more contact objects is displayed by means of the display unit 400 (401). For example, the control unit 500 provides the standby screen presenting at least one contact object mapped to the corresponding contact information as described above.

Next, the control unit 500 detects an event occurred in the state where the specific screen has been displayed (403). For example, the event can be triggered by the signal received by means of the communication unit 100. In an embodiment of the present invention, the event can be an incoming message receipt or an incoming call receipt event. In an embodiment of the present invention, the incoming message can be any of various types of messages such as Short Messaging Service (SMS), Multimedia Messaging Service (MMS), email service, and Instant Message (IM) service message; and the message receipt event can be an event that occurred when an incoming message is received as described above. In an exemplary embodiment of the present invention, the call receipt event can be the event occurred when the call establishment request for a voice call or a video call is received. Although now depicted, the event can include an event occurred when a chatting request is received from a counterpart in a chatting service.

With continued reference to FIG. 4, once an event is detected, the control unit 500 extracts the information of the person who triggered the event (405). For example, when the event is detected, the control unit 500 analyzes an event trigger signal received by the communication unit 100 to extract the type of the event and the phone number of the counterpart.

Next, the control unit 500 traces the contact object corresponding to the extracted event information (407). For example, the control unit 500 can trace the contact object having the counterpart information contained in the event information among the contact objects presented in the specific screen. Next, the control unit 500 determines whether or not the contact object representing the person (counterpart) having the counterpart information contained in the extracted event information is registered with the specific screen (409).

If the contact object representing the counterpart is not registered with the specific screen at step 409, the control unit 500 handles the event according to a user setting (411).

In case that the user setting indicates presentation-disabled on the specific screen, the control unit 500 handles the message or call receipt event as previously discussed.

In case that the user setting indicates presentation-enabled on the specific screen, the control unit 500 retrieves the counterpart information corresponding to the event information from the storage unit 300 (e.g. phone book). In this case, the control unit 500 can present the contact object corresponding to the retrieved user information at a position of the specific screen in the form of a popup or an enlargement presentation as described above. The control unit 500 can control such that the presented contact object is maintained or no longer displayed. For example, when the user setting indicates keeping the contact item in the specific screen, the control unit 500 controls such that the contact object are shown continuously in the specific screen after presenting the contact information and handling the event. The control unit 500 also can control such that the contact object is presented in the specific screen according to the usage frequency of the contact object. The usage frequency-based content object presentation procedure is described later.

Returning to the flowchart of FIG. 4, if the contact object of the counterpart triggered the event is registered with the specific screen at step 409, the control unit 500 handles the event with a predetermined effect around the contact object (413). For example, the control unit 500 checks the contact information presentation option, i.e., popup presentation option or enlargement presentation option. Next, the control unit 500 controls such that the contact information is presented according to the preset contact information presentation option (415).

Next, the control unit 500 monitors for detection of a user input for executing an interaction associated with the event (417). As aforementioned, the control unit 500 can detect a user input made to the menu items provided with the contact information.

If there is no user input for executing an interaction associated with the event, the control unit 500 executes an operation set for such situation (419). For example, the control unit 500 can control such that the contact information appears for a predetermined time and then is no longer displayed after the expiry of the predetermined time.

Otherwise, if a user input made to an option provided with the contact information at step 417, the control unit 500 controls such that the interaction requested according to the option is executed with the presentation of the execution result on the screen (421). For example, in case that the event is the incoming message receipt event, the control unit 500 executes the message checking interaction to display the content of the message. In case that the event is the incoming call reception event, the control unit 500 executes the call setup establishment in response to the accept menu selection along with the display of call progression screen and rejects the incoming message in response to the reject menu selection along with the display of rejection screen.

Figure 5:
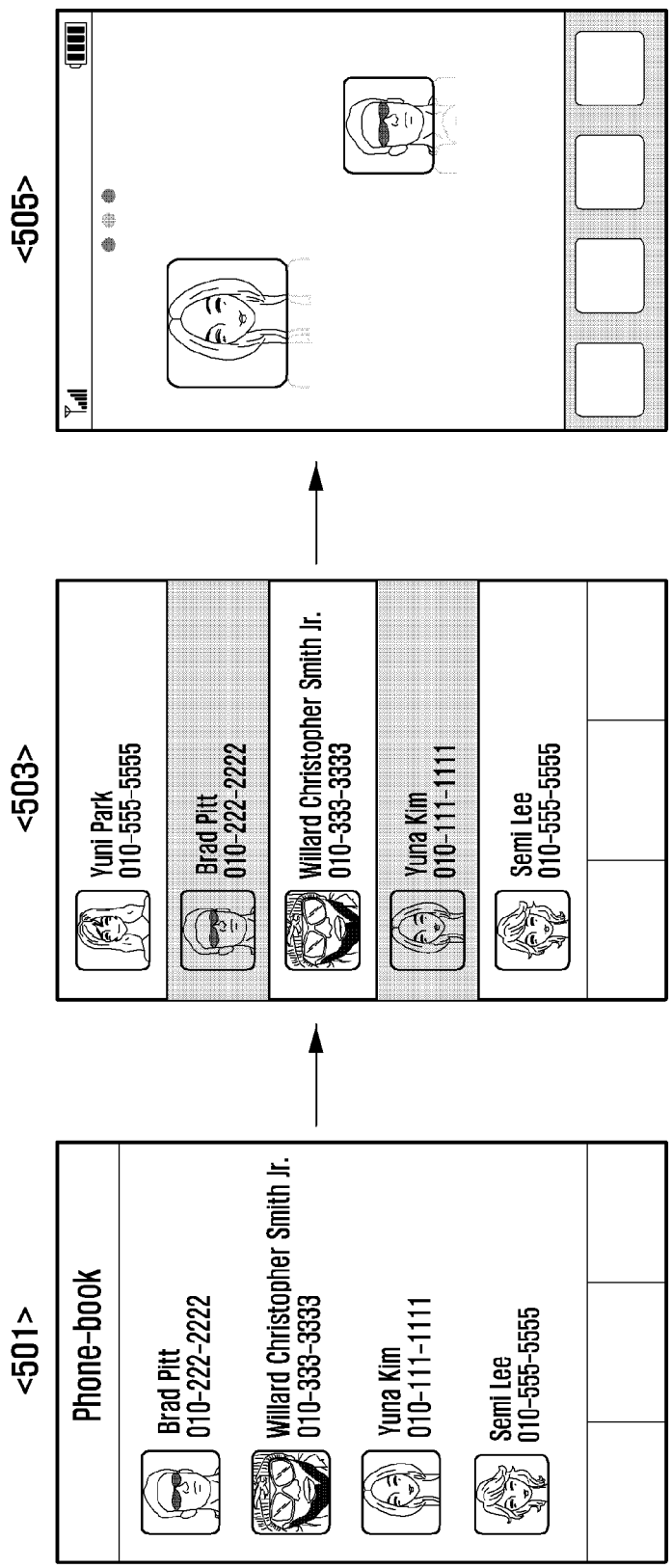
FIG. 5 is a diagram illustrating exemplary screens showing counterpart-specific contact object registration process in the event-triggered information provision method of a mobile terminal according to an exemplary embodiment of the present invention.

FIG. 5 is a diagram illustrating exemplary screens showing counterpart-specific contact object registration process in the event-triggered information provision method of a mobile terminal according to an exemplary embodiment of the present invention. Particularly, FIG. 5 shows an exemplary case where the contact objects are registered with a specific screen according to the manual setting of the user.

As shown in part 501 of FIG. 5, the screen provides a list (e.g., phonebook list) composed of at least one contact item. The user can select at least one contact item from the list and registers the selected contact item as the contact object with the specific screen. According to an exemplary embodiment of the present invention, it is assumed that the list screen of part 501 of FIG. 5 is provided with a setting menu for supporting registration of contact objects with the specific screen. Accordingly, the user can activate the contact object registration mode by manipulating the setting menu provided in the list screen of part 501 of FIG. 5.

In the state where the contact object registration mode is activated, the user can then select a contact item (hereinafter, the term "contact item" is used interchangeably with "contact object"), as shown in the screen image of part 503 of FIG. 5. At this time, multiple contact items can be selected sequentially or simultaneously. After selecting the contact item as shown in the screen image of the part 503, the user can register the selected contact item as the contact object. For example, the control unit 500 can activate the submenu and receive a registration command input by the submenu in a state where the screen of part 503 is displayed.

If a request for registering the contact object selected in the screen image of part 503 is input, the control unit 500 controls such that the selected contact object is presented in the specific screen (e.g., standby screen) as shown in the screen image of part 505 of FIG. 5. For example, if a contact object registration request is input, the control unit 500 creates the contact object based on the counterpart information (e.g., image information) stored with the corresponding contact item. The counterpart information can include image, phone number, name, and the like of the person being represented by the contact item. The control unit 500 can create the image of the contact object in a predetermined size using the image information and save the phone number and name with the mapping to the created image. The created image can be presented in the form of an icon at a random position (or specific position determined in an order) of the specific screen.

Figure 6:
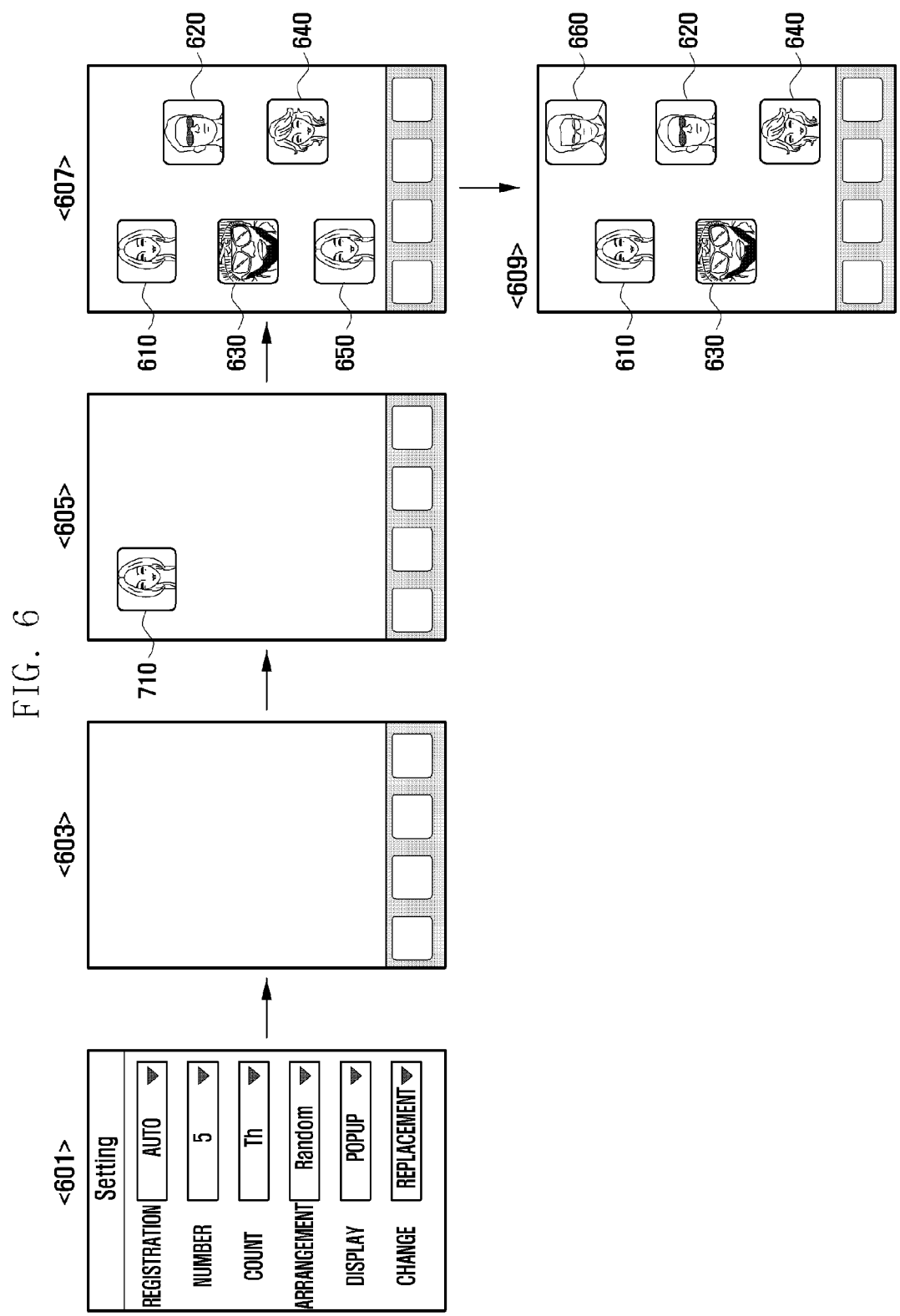
FIG. 6 is a diagram illustrating exemplary screens showing counterpart-specific contact object registration process in the event-trigger information provision method of a mobile terminal according to another exemplary embodiment of the present invention.

FIG. 6 is a diagram illustrating exemplary screens showing counterpart-specific contact object registration process in the event-trigger information provision method of a mobile terminal according to another exemplary embodiment of the present invention. Particularly, FIG. 6 shows an exemplary case where the contact objects are registered with a specific screen according to the automatic configuration.

As shown in part 601 of FIG. 6, the screen provides a user interface for configuring the creation of the contact objects. Through the user interface as shown in part 601 of FIG. 6, the user can configure the automatic contact object creation function.

As shown in the screen image of part 601 of FIG. 6, the user interface includes a <registration> field for setting the type of contact object registration, a <condition> field for setting the condition of the contact object to be presented in the specific screen, an <arrangement> field for setting the arrangement method of the contact objects in the specific screen, a <display> field for setting the output method of the contact information, and <change> field for setting the contact object handling scheme according to the limit of the number of registered contact objects. The <condition> field can include, for example, a <number> field for setting the number of contact objects to be registered with the specific screen and a <count> field for setting the criteria (e.g., minimum usage frequency) of the registration of the contact object with the specific screen.

The <registration> field can be set to one of automatic registration, manual registration, and function disable. In case that the <registration> field is set to function disable, when an event occurs, the event is handled without output of the contact information. In FIG. 6, it is assumed that the <registration> field is set to automatic registration. The <number> field can be set to a value indicating the number of contact objects that can be registered with the specific screen. In FIG. 6, it is assumed that the <number> field is set to 5. The <number> field can be set to a value equal to or greater than 1 up to a maximum value supported by the mobile terminal. The <number> field also can be set for automatic configuration such that the contact objects are registered up to the maximum available number.

The <counter> field can be set to a threshold value for determining whether or not to register the contact object. For example, when the <count> field is set to a threshold value (Th), when the usage frequency of the corresponding contact object is greater than the threshold value, the corresponding contact object is registered with the specific screen. When an event occurs, the value of the <count> field increments according to the retrieval of the counterpart information. The value of the <count> field is preferably accumulated and recorded per counterpart.

The <arrangement> field can be set for the arrangement method of the contact objects. For example, the contact objects can be arranged randomly or in a predetermined order according to the value of the <arrangement> field. In FIG. 6, it is assumed that <arrangement> field is set for random arrangement.

The <display> field is set for how to present the contact information. As previously mentioned, the <display> field can be set for one of the text balloon type popup presentation as aforementioned with reference to FIG. 2, overlay type enlargement presentation as aforementioned with reference to FIG. 3, event type-based automatic output, and random presentation of one of the popup and enlargement presentation.

The <change> field is preferably set to a registration scheme for determining whether to register a new contact object fulfilling the preset condition in case that the number of contact objects is limited in the specific screen. For example, a new contact object fulfilling the configuration condition can appear in the state where maximum 5 contact objects are presented in the specific screen. The <change> field can be set to "fixed" such that the previous contact object configuration is maintained. The <change> field also can be set to "replace" such that the contact object having low usage frequency is replaced by a new contact object having high usage frequency.

As aforementioned, the setting information configured through the menu manipulation can be saved. The setting information is saved in the storage unit 400 and can be modified afterward.

A description is now made of the operations after the contact object registration scheme are configured through the user interface as shown in the screen image of part 601 of FIG. 6. Here, it is assumed that the settings are configured initially such that there is no contact object in the specific screen (e.g., standby screen) as shown in part 603 of FIG. 6. Part 603 of FIG. 6 shows the screen at the initial step, part 605 of FIG. 6 shows the screen with which one contact object is registered based on the usage frequency, part 607 shows the screen with which maximum 5 contact objects are registered, and part 609 shows the screen in which a specific contact object is replaced by another contact object according to the usage frequency.

In the state where the screen of part 603 is displayed, the mobile terminal can perform a function according to an external event. For example, the control unit 500 can count the use of the counterpart information corresponding to the event information of the corresponding event. When the count value of specific counterpart information is equal to the threshold value (Th) through the screen of part 601 of FIG. 6, a contact object can be crated based on the corresponding counterpart information.

As depicted in the screen image of part 605 of FIG. 6, the created contact object 610 is presented in the specific screen. At this time, the contact object 610 can be presented at a random position according to the random arrangement scheme set in the screen image of part 601 of FIG. 6.

Through the aforementioned exemplary process, a predetermined number of contact objects, i.e., five contact objects 610, 620, 630, 640 and 650, are presented in the specific screen as shown in part 607 of FIG. 6.

Even after the predetermined number (e.g., 5) of contact objects 610, 620, 630, 640, and 650 are presented, the count can continue operating according to the configuration. For example, when the <change> field is set to the value of substitution in the screen image of part 601 of FIG. 6, the count per counterpart information continues running, and when the <change> field is set to the value for fixed mode and 5 contact objects are presented, the count of each counterpart can be disabled.

If counting continues, new counterpart information having the count value greater than those of the contact objects 610, 620, 630, 640, and 650 shown in the screen image of part 607 of FIG. 6 can appear. The count (first count value) of specific counterpart information increments, whenever an event targeted to the counterpart object occurs, and is compared with the count of the counterpart information corresponding to each of the contact objects 610, 620, 630, 640, and 650. At this time, the count of the counterpart information which increments according to the occurrence of the event, i.e. the first count value, can be compared with the count of the counterpart information corresponding to the contact object having the least value among the contact objects 610, 620, 630, 640, and 650.

At this time, there can be the counterpart information of which count value is less than the count value (first count value) of the specific counterpart information among the contact objects 610, 620, 630, 640, and 650. In this case, the contact object corresponding to the counterpart information having the count value less than the count value of specific counterpart information is removed from the specific screen. And, the new contact object 660 created based on the specific counterpart information is presented at a random position. As shown in screen of part 609, the old contact object 650 disappears and the new contact object 660 appears at a random position.

Although not depicted in FIG. 6 and not described, there can be provided a configuration information initialization option. Particularly, functions for initializing individual counts or all the counts can be provided.

Figure 7:
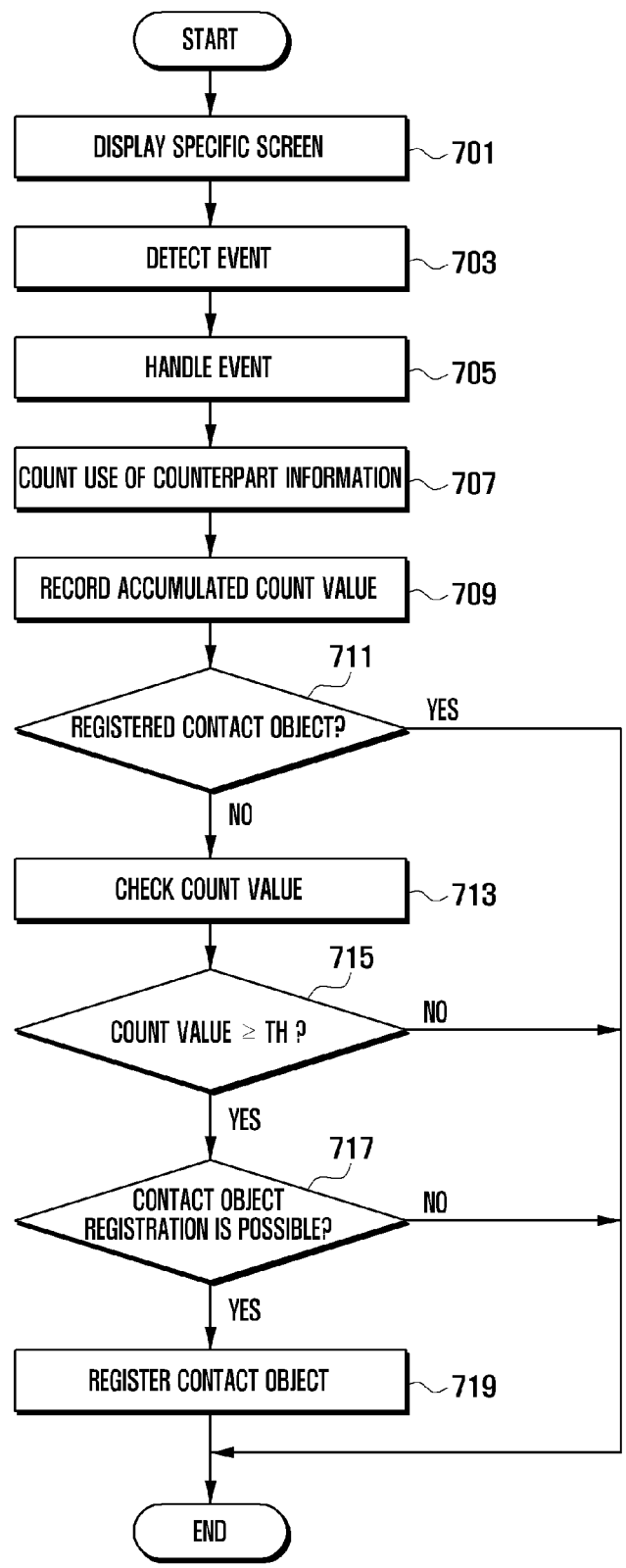
FIG. 7 is a flowchart illustrating a contact object registration procedure of the event-triggered information provision method of the mobile terminal according to an exemplary embodiment of the present invention.

FIG. 7 is a flowchart illustrating a contact object registration procedure of the event-triggered information provision method of the mobile terminal according to an exemplary embodiment of the present invention. Particularly, FIG. 7 shows the procedure for registering the contact objects according to the automatic configuration as described with reference to FIG. 6.

Referring now to FIG. 7, at (701) the control unit 500 controls such that an initial specific screen having no contact object or a specific screen having at least one contact object is displayed as shown in FIG. 6.

Next, at (703), the control unit 500 detects an event in the state where the specific screen is displayed. For example, the control unit 500 can detect the event occurred by receiving a signal by means of the communication unit 100 in the state where the specific screen is displayed. According to an exemplary embodiment of the present invention, the event can be the incoming message receipt or the incoming call receipt as described above.

Once the event is detected, at (705) the control unit 500 handles the event. For example, the control unit 500 can control such that the contact information is presented with the execution of a related function as described with reference to FIG. 4.

Next, at (707) the control unit 500 counts the use of the counterpart information corresponding to the event information extracted in association with the event. For example, the control unit 500 retrieves the counterpart information corresponding to the event information and increments the count of the counterpart information by 1. At (709), the control unit 500 records the accumulation of the count value per the counterpart information.

Next, at (711) the control unit 500 determines whether or not the contact object corresponding to the counterpart information is registered with the specific screen. If the contact object corresponding to the counterpart information is registered with the specific screen at (711), the control unit 500 ends the contact object registration procedure. Otherwise, if the contact object corresponding to the counterpart information is not registered with the specific screen at step 711, then at (713) the control unit 500 checks the count value of the counterpart information and at (715) determines whether the count value is equal to or greater than a predetermined threshold value (Th).

If at (715) the count value is less than the threshold value (Th), the control unit ends the contact object registration procedure. Otherwise, if at (715) the count vale is equal to or greater than the threshold value (Th), then at (717) the control unit 500 determines whether the contact object corresponding to the counterpart information can be registered with the specific screen. For example, if the count value of the counterpart information is equal to or greater than the threshold value (Th), the control unit 500 checks the number of the contact objects presented in the specific screen and determines whether the number of the contact objects is equal to a preset maximum number of contact objects. If the number of the contact objects is less than the preset maximum number, the control unit 500 determines that it is possible to add a new contact object to the specific screen. Otherwise, if the number of the contact objects is equal to the present maximum number of the contact objects, the control unit 500 determines that it is impossible to add a new contact object to the specific screen. In case that the <change> field is set to the value "replace" as shown in part 601 of FIG. 6, the control unit 500 determines that it is possible to replace the one of the contact objects with a new contact object.

If at (717), the contact object corresponding to the counterpart information cannot be registered with the specific screen, the control unit 500 ends the contact object registration procedure. Otherwise, if at (717) the contact object corresponding to the counterpart information can be registered with the specific screen, the control unit 500 creates the contact object based on the counterpart information and at (719) registers the contact object with the specific screen. Here, the newly created contact object can be arranged at a random position or a specific position determined in a predetermined order according to the value of the <arrangement> field as shown in part 601 of FIG. 6.

Figure 8:
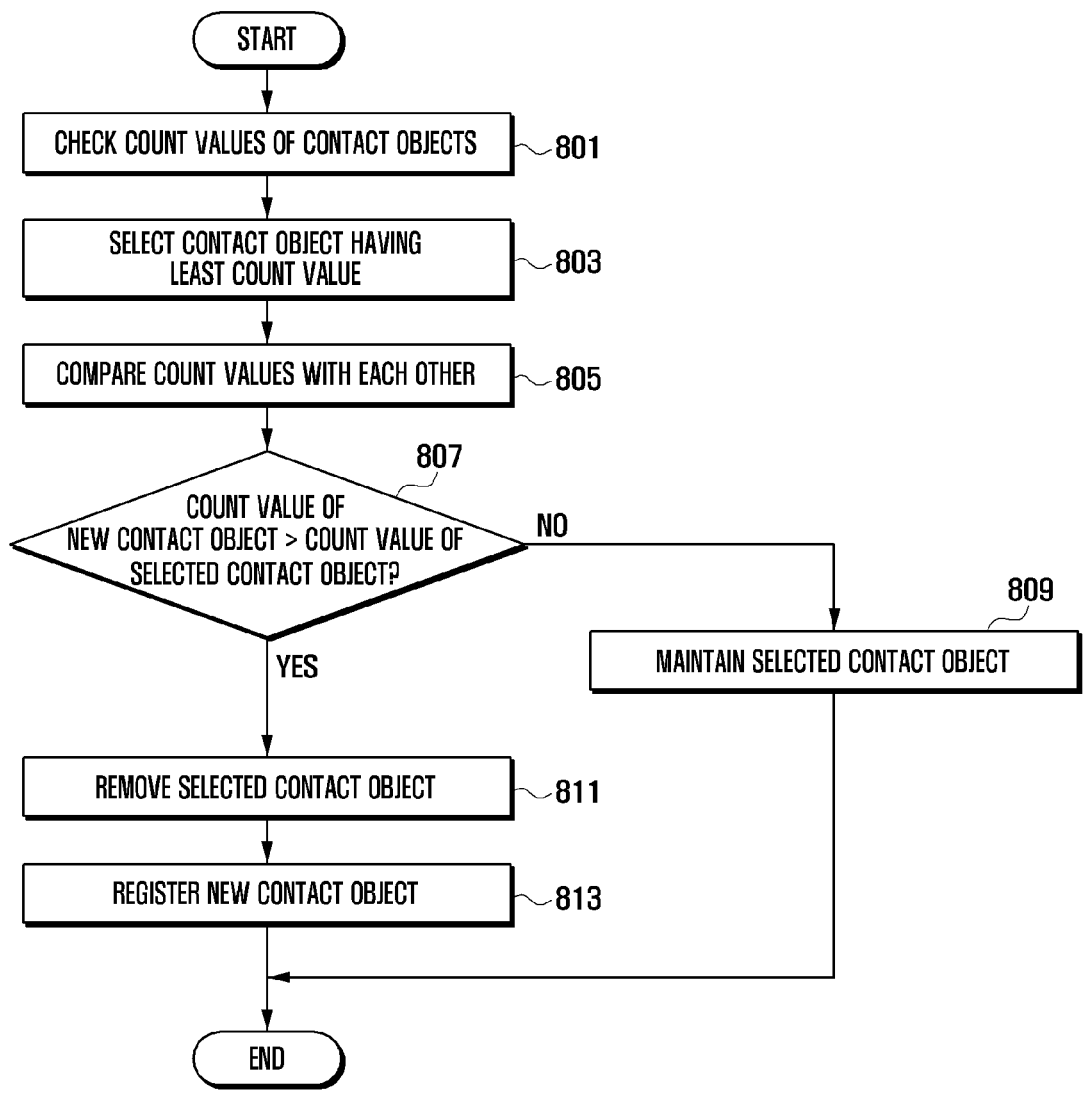
FIG. 8 is a flowchart illustrating a contact object replacement procedure of the event-triggered information provision method of the mobile terminal according to an exemplary embodiment of the present invention.

FIG. 8 is a flowchart illustrating a contact object replacement procedure of the event-triggered information provision method of the mobile terminal according to an exemplary embodiment of the present invention. Particularly, FIG. 8 shows the procedure for registering a new contact object in the case where the number of contact objects presented in the specific screen has already reached the preset maximum number at the time when the contact object registration is required due to the occurrence of a specific event as shown in the example of FIGS. 6 and 7.

Referring now to FIG. 8, at (801) the control unit 500 checks the count value of each of the contact objects presented in the specific screen, when it is required to determine whether to replace a contact object, in the state where the number of contact objects has already reached the maximum available number. For example, the control unit 500 can check the count value of the counterpart information corresponding to each contact object presented in the specific screen.

Next, at (803) the control unit 500 selects the contact object having the least count value from among the contact objects presented in the specific screen.

Once the contact object is selected, at (805) the control unit 500 compares the count value of the counterpart information corresponding to the selected contact object (hereinafter, called "count value of selected contact object") with the count value of the counterpart information corresponding to the event information (hereinafter, called "count value of new contact object). Next, at (807) the control unit 500 determines whether the count value of the new contact object is greater than the count value of selected contact object.

If at (807) the count value of the new contact object is less than or equal to the count value of selected contact object, then at (809) the control unit 500 controls such that the selected contact object is maintained in the specific screen. Otherwise, if at (807) the count value of the new contact object is greater than the count value of selected contact object, then at (811) the control unit 500 removes the selected contact object from the specific screen. Next, at (813) the control unit 500 registers the new contact object with the specific screen. As previously mentioned, the control unit 500 controls such that the new contact object is presented at a random position or a specific position determined in an order.

The aforementioned description has been directed to the exemplary case where the event is an incoming message receipt or an incoming call receipt event occurred by a signal from outside. However, the presently claimed invention is not limited thereto but can be applied to other cases, for example the case where the event occurred inside of the mobile terminal. For example, when a user input is made to the contact object presented in the screen, the control unit 500 can handle the user input as the event as described above. Accordingly, the control unit 500 can control such that the contact information of the person who triggered the event is presented around the contact object as described above. Here, the count value indicating the number of occurrences of the event can be determined according to the usage frequency of the corresponding contact object. That is, the number of inputs made by the user can be counted.

As described above, the information provision method and apparatus of a mobile terminal according to the present invention updates the configuration of a specific screen according to the usage frequencies of contact objects presenting individual persons and notifies and handles event occurred by a person with the corresponding contact object. When an event occurs in the state where a specific screen is displayed, the mobile terminal presents the contact information of the person who has triggered the event around the contact object representing the person, whereby the user can recognize who has triggered which event intuitively.

In the information provision method and apparatus of a mobile terminal according to the present invention, when an event occurs in a state where a specific screen having a plurality of contact objects, the mobile terminal presents the contact information of the person who triggered the event around the contact object representing the person without screen switching, whereby the user can check the contact information of the counterpart and make an interaction. The information provision method and apparatus of a mobile terminal provides contact information of a person who triggered an event around a contact object representing the person without screen switching, resulting in improvement of usability and usage convenience and familiarity.

As described above, the event-triggered information provision method and apparatus of a mobile according to the present invention can be implemented in the form of program commands executable by various types of computer means so as to be stored in a computer-readable storage media. The computer-readable storage medium can store any or a combination of programs commands, data files, and data structure. The program commands recorded in the storage medium can be designed and structured according to the present invention, but may be the ones well-known to and practiced by those skilled in the art.

The computer-readable storage medium can be any of magnetic media including hard disk, floppy disk, and magnetic tape, optical media including Compact Disc Read Only Memory (CD-ROM) and Digital Versatile Disc (DVD), magneto-Optical Media including Floptical Disk, Read Only Memory (ROM), Random Access Memory (RAM), and Flash memory that can be configured to store the program commands.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, microprocessor or a special processor or in programmable or dedicated hardware, such as an ASIC or FPGA. As would be understood in the art, the computer, the processor, microprocessor (controller) or the programmable hardware include memory components, e.g., RAM, ROM, Flash, etc. that may store or receive software or computer code that when accessed and executed by the computer, processor or hardware implement the processing methods described herein.

The program commands can include high-level language codes that can be executable in the computer with the interpreter as well as machine language code produced by a compiler. The hardware device can be configured to operate in the form of more than one software module for performing the operation of the present invention and vice versa.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

While the invention has been shown and described with reference to certain exemplary embodiments thereof, it will be understood by those skilled in the art that various changes in form and details may be made therein without departing from the spirit and scope of the invention as defined in the appended claims and their equivalents.

What is claimed is:

1. A method of a mobile terminal, comprising:
    displaying contact objects associated with stored contacts on a display;
    detecting an event by at least one processor related to a particular contact of the stored contacts;
    detecting one of the contact objects associated with the event by the at least one processor; and
    displaying contact information of the particular contact proximate to the detected contact object; and
    when the event is an incoming call:
        moving the detected contact object to a center portion of the display while maintaining other displayed contact objects on the display and enlarging a size of the detected contact object at a predetermined rate, and
        when the incoming call is accepted, maintaining the contact object with the enlarged size at the center portion of the display and displaying at least one selectable function or information associated with the accepted incoming call overlaid on at least one of the other contact objects maintained on the display,
    wherein the at least one selectable function or information is overlaid on the at least one of the other contact objects, such that an entirety of the detected contact object is unobstructed by the at least one selectable function or information.

2. The method of claim 1, wherein detecting one of the contact objects further comprises extracting event information by the at least one processor including caller information, and searching a stored phonebook for the particular contact that corresponds to the event information.

3. The method of claim 1, wherein detecting one of the contact objects further comprises:
    extracting event information received with the event;
    extracting counterpart information including a phone number by the at least one processor from the event information; and
    detecting the particular contact matching the counterpart information.

4. The method of claim wherein detecting the particular contact further comprises:
    detecting whether the particular contact having the counterpart information is displayed on the display; and when the particular contact having the counterpart information is not displayed on the display, generating a contact object based on the counterpart information for display on the display.

5. The method of claim 4, wherein detecting the particular contact further comprises:
displaying the generated contact object on the display; and
displaying contact information of the particular contact proximate to at least a portion of the displayed generated contact object.

6. The method of claim 5, further comprising:
removing, by the at least one processor, the displayed generated contact object from the display after displaying the contact information.

7. The method of claim 3, wherein the contact information is displayed as a balloon popup.

8. The method of claim 3, wherein the contact information comprises a type of the event, and options selectable to execute functions related to the event, and counterpart information further indicates the particular contact triggering the event.

9. The method of claim 1, wherein the event is at least one of a message receipt and a call receipt.

10. The method of claim 1, further comprising displaying the contact information of the particular contact on the display without switching a current display screen.

11. The method of claim 1, further comprising:
displaying selectable menu items for executing functions related to the event; and
in response to detecting a selection of one of the menu items, executing a corresponding function.

12. The method of claim 1, wherein:
each of the contact objects are mapped to counterpart information of each of the stored contacts;
the displayed contacts are registered to be displayed on a home screen of the mobile terminal when a predefined condition is fulfilled.

13. The method of claim 12, further comprising:
increasing a usage count of the counterpart information when an event is detected; and when the usage count of the counterpart information is greater than a predetermined threshold value, generating the contact object based on the counterpart information; and registering the contact object to be displayed on the home screen.

14. The method of claim 13, wherein registering the contract object further comprises:
when the usage count is greater than the threshold value, detecting whether the generated contact object based on the counterpart information can be registered.

15. The method of claim 14, wherein registering the contact object further comprises removing a presently displayed contact object having a lowest usage count from the display before registering the generated contact object and displaying the generated contact object on the display.

16. A mobile terminal apparatus, comprising:
a display unit to display, on a specific screen, contact objects associated with stored contacts; and
at least one processor to:
update configuration of the specific screen according to usage frequency of the stored contacts;
detect an event related to a particular contact of the stored contacts;
detect one of the contact objects associated with the event and display contact information of the particular contact proximate to the detected contact object; and
when the event is an incoming call:
move the detected contact object to a center portion of the display while maintaining other displayed contact objects on the display unit and enlarging a size of the detected contact object at a predetermined rate, and
when the incoming call is accepted, maintain the contact object with the enlarged size at the center portion of the display and display at least one selectable function or information associated with the accepted incoming call overlaid on at least one of the other contact objects maintained on the display unit,
wherein the at least one selectable function or information is overlaid on the at least one of the other contact objects such that an entirety of the detected contact object is unobstructed by the at least one selectable function or information.

17. The apparatus of claim 16, wherein the contact information is displayed as a text balloon popup without changing the specific screen on the display.

18. The apparatus of claim 17, wherein the contact information comprises type information indicating a type of the event, counterpart information indicating identity of the particular contact triggering the event, and menu items selectable to execute functions related to the event.

19. The information of claim 17, wherein each of the contact objects is mapped to counterpart information of each of the stored contacts; and the displayed contacts are registered to be displayed on a home screen of the mobile terminal when a predefined condition is fulfilled.

20. The method of claim 1, wherein the contact objects associated with stored contacts are displayed on a home screen displayed on the display; and
when the detected contact object is moved and enlarged, display of the contact objects and the home screen is maintained on the display.

* * * * *